(12) United States Patent
Nie (10) Patent No.: US 11,579,767 B2
(45) Date of Patent: Feb. 14, 2023

(54) CONTENT DELETING METHOD, TERMINAL, AND COMPUTER READABLE STORAGE MEDIUM

(71) Applicant: VIVO MOBILE COMMUNICATION CO., LTD., Dongguan (CN)

(72) Inventor: Biaofei Nie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/383,416

(22) Filed: Jul. 22, 2021

(65) Prior Publication Data

US 2021/0349594 A1 Nov. 11, 2021

Related U.S. Application Data

(63) Continuation of application No. PCT/CN2020/071763, filed on Jan. 13, 2020.

(30) Foreign Application Priority Data

Jan. 24, 2019 (CN) .......................... 201910067111.7

(51) Int. Cl.
*G06F 3/0488* (2022.01)
*H04M 1/724* (2021.01)
*G06F 3/0482* (2013.01)

(52) U.S. Cl.
CPC .......... *G06F 3/0488* (2013.01); *G06F 3/0482* (2013.01); *H04M 1/724* (2021.01)

(58) Field of Classification Search
CPC .. G06F 3/0488; G06F 3/0482; G06F 3/04883; G06F 3/04842; H04M 1/724; H04M 1/72403
See application file for complete search history.

(56) References Cited

U.S. PATENT DOCUMENTS

| 8,379,129 | B2* | 2/2013 | Iwase | A63F 13/06 |
| | | | | 348/222.1 |
| 9,612,740 | B2* | 4/2017 | Mesguich Havilio | |
| | | | | G06F 3/0482 |
| 2008/0256473 | A1* | 10/2008 | Chakra | G06F 3/0481 |
| | | | | 715/772 |
| 2009/0106684 | A1* | 4/2009 | Chakra | G06F 3/04812 |
| | | | | 715/772 |

(Continued)

FOREIGN PATENT DOCUMENTS

| CN | 102821193 A | 12/2012 |
| CN | 102985904 A | 3/2013 |

(Continued)

OTHER PUBLICATIONS

Search Report issued in related Chinese Application No. 201910067111.7, dated Mar. 21, 2020, 6 pages.

*Primary Examiner* — Shen Shiau
(74) *Attorney, Agent, or Firm* — IPX PLLC (57) ABSTRACT

The present disclosure provides a content deleting method, a terminal, and a non-transitory computer readable storage medium. The method deleting method includes: acquiring a selected target content in a terminal interface when a content on the terminal interface is in a deletable state; and performing deletion operation on the target content if detecting a preset sliding track aiming at the target content.

15 Claims, 4 Drawing Sheets

(56) References Cited

U.S. PATENT DOCUMENTS

| | | | |
|---|---|---|---|
| 2009/0113334 A1* | 4/2009 | Chakra | G06F 9/451 715/772 |
| 2009/0298546 A1* | 12/2009 | Kim | G06F 1/1686 455/566 |
| 2010/0031203 A1* | 2/2010 | Morris | G06F 3/04883 715/863 |
| 2010/0085318 A1* | 4/2010 | Lee | G06F 3/0482 345/173 |
| 2012/0200716 A1* | 8/2012 | Torikai | H04N 1/32112 348/207.1 |
| 2012/0324371 A1 | 12/2012 | Wilson et al. | |
| 2013/0132883 A1* | 5/2013 | Vayrynen | G06F 3/0482 715/773 |
| 2013/0234963 A1* | 9/2013 | Yu | G06F 3/0412 345/173 |
| 2014/0191986 A1* | 7/2014 | Kim | G06F 3/04817 345/173 |
| 2014/0223382 A1* | 8/2014 | Hicks | G06F 3/04883 715/863 |
| 2014/0298253 A1* | 10/2014 | Jin | G06F 3/04883 715/790 |
| 2014/0331175 A1* | 11/2014 | Mesguich Havilio | G06F 3/0481 715/863 |
| 2015/0046884 A1 | 2/2015 | Moore et al. | |
| 2015/0139549 A1* | 5/2015 | Ookawara | G06F 3/0484 382/189 |
| 2015/0227308 A1* | 8/2015 | Kim | G06F 3/0483 715/769 |
| 2016/0055232 A1* | 2/2016 | Yang | G06T 11/206 707/740 |
| 2016/0124620 A1* | 5/2016 | Bao | G06F 3/0488 715/808 |
| 2016/0266703 A1* | 9/2016 | Sugimoto | G06F 3/0485 |
| 2016/0291843 A1* | 10/2016 | Sheng | G06F 9/48 |
| 2017/0046025 A1 | 2/2017 | Dascola et al. | |
| 2018/0081537 A1* | 3/2018 | Jingushi | H04B 1/3827 |
| 2018/0329586 A1* | 11/2018 | Sundstrom | G06F 3/04883 |
| 2018/0335937 A1* | 11/2018 | Hauenstein | G06F 3/04817 |
| 2019/0073099 A1* | 3/2019 | Liu | G06F 3/04817 |
| 2020/0110529 A1* | 4/2020 | Gao | G06F 8/61 |
| 2020/0233878 A1* | 7/2020 | Huang | G06F 16/258 |
| 2022/0137792 A1* | 5/2022 | Chen | G06F 3/0486 715/769 |

FOREIGN PATENT DOCUMENTS

| | | | | |
|---|---|---|---|---|
| CN | 103605743 A | | 2/2014 | |
| CN | 104965664 A | | 10/2015 | |
| CN | 105260120 A | * | 1/2016 | |
| CN | 105808081 A | * | 7/2016 | |
| CN | 106066755 A | * | 11/2016 | |
| CN | 106293469 A | | 1/2017 | |
| CN | 106445590 A | | 2/2017 | |
| CN | 106775409 A | | 5/2017 | |
| CN | 107256111 A | | 10/2017 | |
| CN | 108073405 A | | 5/2018 | |
| CN | 108073405 A | * | 5/2018 | ......... G06F 3/04817 |
| CN | 108334227 A | | 7/2018 | |
| CN | 109831579 A | | 5/2019 | |
| CN | 111198637 A | * | 5/2020 | ......... G06F 3/04817 |
| WO | WO-2020024518 A1 | * | 2/2020 | |

* cited by examiner

CONTENT DELETING METHOD, TERMINAL, AND COMPUTER READABLE STORAGE MEDIUM

CROSS-REFERENCE TO RELATED APPLICATION

This application is a bypass continuation of PCT Application No. PCT/CN2020/071763 filed Jan. 13, 2020, which claims priority to Chinese Patent Application No. 201910067111.7 filed in china on Jan. 24, 2019, both of which are incorporated herein by reference in their entireties.

TECHNICAL FIELD

The present disclosure relates to the technical field of terminals, and in particular to a content deleting method, a terminal, and a computer readable storage medium.

BACKGROUND

Figure 1:
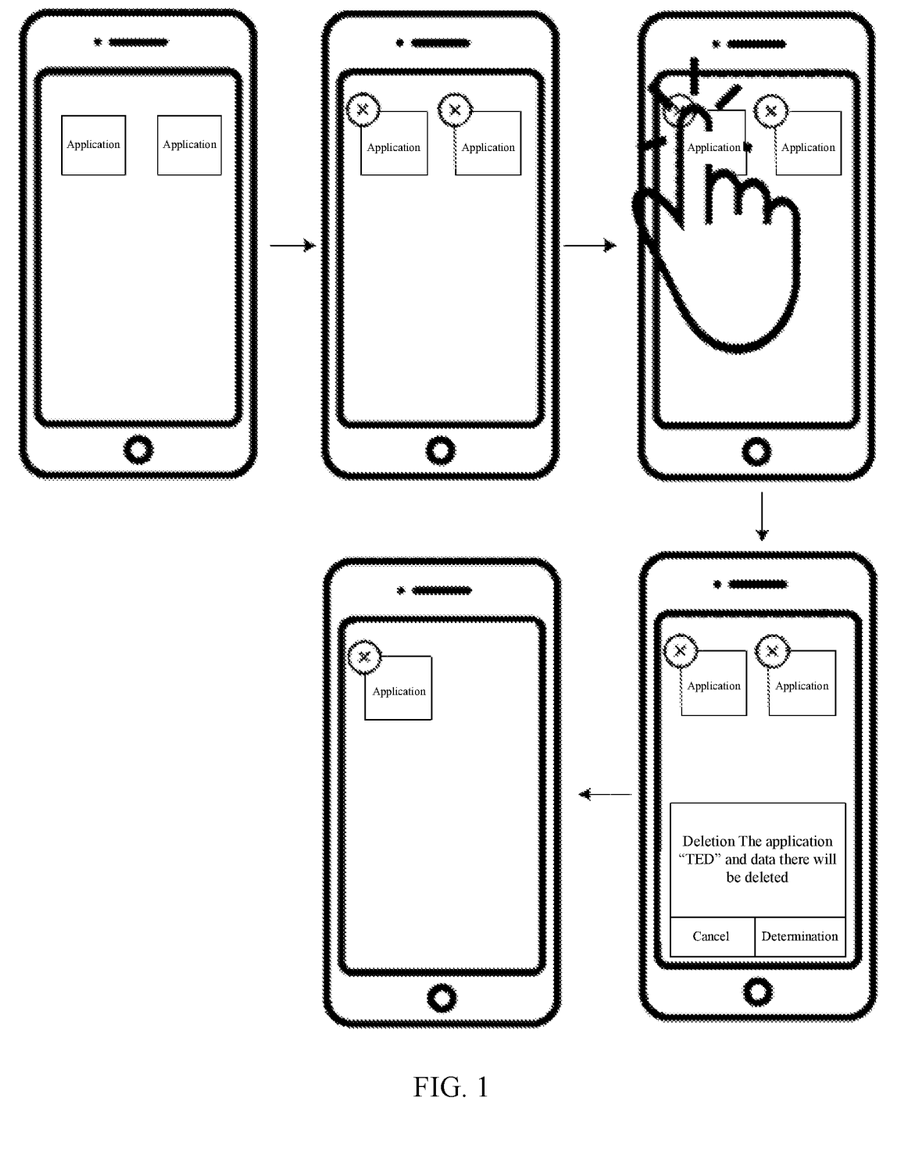
FIG. 1 is a schematic diagram of an app deletion process in related art.

With the development of science and technology, mobile phones have gradually become an indispensable part of people's life, and colorful app applications are more and more convenient to download and install in the mobile phones from all major application markets. However, as more and more applications are installed in the mobile phones, there will be more and more infrequently used app applications in the mobile phones, so users will often delete some infrequently used app applications from the mobile phones. For example, when the user deletes a certain app, the process is shown in FIG. 1, and the operation mode of deleting the app application by a mobile phone operating system is as follows: an application interface is opened; the application is long pressed to start the function of deleting the app application, and a small round cross appears at the upper left corner of the application; the small round cross at the upper left corner of a certain application to be deleted is clicked; the pop-up box displays confirm and cancel buttons; and after the user clicks the confirm button, the pop-up box disappears and the application is deleted.

However, it is troublesome to click the small round cross at the upper left corner of the application with fingers, and the action area is relatively small. For some girls with thick fingers and long nails, clicking on the small round cross at the upper left corner of the application to delete an app sometimes requires several operations to click, which will directly affect the operation of the user and reduce the user experience. In addition, the interface which displays whether to delete in the pop-up box gives the user an unfriendly visual experience, resulting in the delay of deleting the undesired applications.

SUMMARY

An objective to the present disclosure is to provide a content deleting method, a terminal, and a computer readable storage medium, so as to solve the problems in related art that the app application deleting solution is complicated in process and inconvenient in operation.

To solve the above technical problem, the present disclosure is implemented as follows:

According to a first aspect, an embodiment of the present disclosure provides a content deleting method, applied to a terminal, including:

acquiring a selected target content in a terminal interface when a content on the terminal interface is in a deletable state; and performing deletion operation on the target content if detecting a preset sliding track aiming at the target content.

According to a second aspect, an embodiment of the present disclosure further provides a terminal, including:

a first acquisition module, configured to acquire a selected target content in the terminal interface when a content on the terminal interface is in a deletable state; and a first processing module, configured to perform deletion operation on the target content if a preset sliding track aiming at the target content is detected.

According to a third aspect, an embodiment of the present disclosure provides a terminal, including a processor, a memory, and a computer program which is stored in the memory and capable of running on the processor, where when being executed by the processor, the computer program implements the steps of the above content deleting method.

According to a fourth aspect, an embodiment of the present disclosure discloses a computer readable storage medium. The computer readable storage medium stores a computer program, where when being executed by a processor, the computer program implements the steps of the above content deleting method.

In the embodiments of the present disclosure, the selected target content in the terminal interface is acquired when the content on the terminal interface is in a deletable state; if the preset sliding track aiming at the target content is detected, deletion operation is performed on the target content; and it is unnecessary to click the small round cross corner mark at the upper left corner of the application and the prompt of the pop-up box to confirm whether to delete when the application is deleted, the interactive experience of the user and the terminal is improved through simple and convenient operation, the safety of deleting the application is ensured, and the problems in the related art that the app application deleting solution is complicated in process and inconvenient in operation are solved well.

DETAILED DESCRIPTION OF EMBODIMENTS

The technical solutions in the embodiments of the present disclosure are described below clearly and completely with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 2:
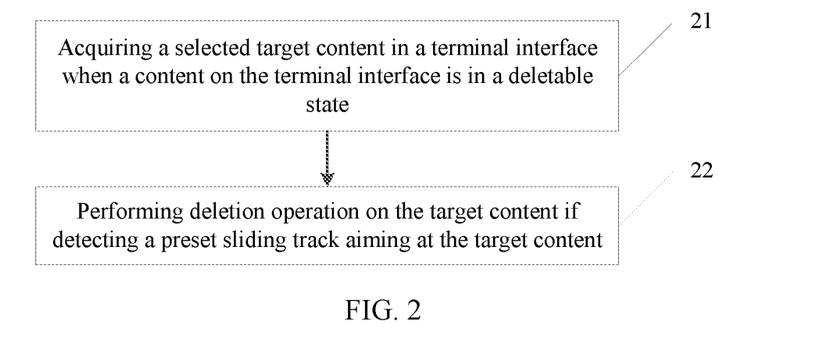
FIG. 2 is a schematic diagram of a process of a content deleting method according to an embodiment of the present disclosure.

For the problems in the related art that an app application deleting solution is complicated in process and inconvenient in operation, the present disclosure provides a content deleting method, applied to a terminal. As shown in FIG. 2, the content deleting method includes:

Step 21: a selected target content in a terminal interface is acquired when a content on the terminal interface is in a deletable state.

The content on the interface may include app, audio and video files, and the like, which are not limited here.

The deletable state refers to a state where a deletion operation can be performed, for example, a state where an icon, which is suspended on a desktop after being long pressed, can be deleted after a preset operation is performed.

Step 22: deletion operation on the target content is performed if a preset sliding track aiming at the target content is detected.

For example: one finger of a user presses a content needing to be deleted, another finger presses a blank space on a terminal screen to move to the content needing to be deleted to form a preset sliding track, and then the content needing to be deleted is deleted.

The preset sliding track may be set according to parameters, such as size and shape, of the screen of the terminal, which is not limited here.

According to the content deleting method provided by the embodiments of the present disclosure, the selected target content in the terminal interface is acquired when the content on the terminal interface is in a deletable state; if the preset sliding track aiming at the target content is detected, deletion operation is performed on the target content; and it is unnecessary to click the small round cross corner mark at the upper left corner of the application and the prompt of the pop-up box to confirm whether to delete when the application is deleted, the interactive experience of the user and the terminal is improved through simple and convenient operation, the safety of deleting the application is ensured, and the problems in the related art that the app application deleting solution is complicated in process and inconvenient in operation are solved well.

The step that the selected target content in the terminal interface is acquired when the content on the terminal interface is in a deletable state includes: when it is detected that a first pressing operation aiming at the terminal interface reaches to a first preset duration, the state of the content on the terminal interface is set as a deletable state; a pressing position of a second pressing operation is detected and the target content corresponding to the pressing position is acquired; and when the duration of the second pressing operation reaches a second preset duration, it is determined that the target content corresponding to the pressing position is the selected target content in the terminal interface.

In this way, erroneous deletion can be avoided to the greatest extent, so that the deleted content is the content that the user needs to delete; and the content is prevented from being deleted with a touch when the content is in a deletable state.

The first pressing operation and the second pressing operation are the same pressing operation or different pressing operations.

The first pressing operation and the second pressing operation are the same pressing operation, for example: a user directly presses the content needing to be deleted on the terminal interface with the index finger, and when the pressing reaches the first preset duration, the content on the interface is directly set as a deletable state and the pressed content serves as the target content.

The first pressing operation and the second pressing operation are different pressing operations, for example: a user presses a blank area on the terminal interface with the index finger, and when the pressing reaches to the first preset duration, the content on the interface is set as a deletable state, the user presses the content needing to be deleted with the ring finger, and the content pressed by the ring finger serves as the target content.

In this way, the content deleting safety and the operation diversity may be further ensured.

Further, after the selected target content in the terminal interface is acquired, the content deleting method further includes: if the preset sliding track aiming at the target content is detected, a deletion progress mark (specifically, it may be displayed at the periphery of the target content, convenient for a user to observe) is displayed.

Correspondingly, the operation of deleting the target content includes: the target content is deleted, and the deletion progress of the target content (specifically, the deletion progress of the target content may be displayed by using the deletion progress mark) is displayed.

In this way, the user can learn the deletion progress of the application in real time, and the use experience of the user is improved.

Specifically, the step that the deletion progress of the target content is displayed includes: the color of the deletion progress mark is updated according to a real-time distance between a tail end of the preset sliding track and the target content, where the color of the deletion progress mark is configured to represent the deletion progress of the target content.

Therefore, it is more convenient for the user to identify the progress.

More specifically, the step that the color of the deletion progress mark is updated according to the real-time distance between the tail end of the preset sliding track and the target content includes: the proportion of a preset color in the deletion progress mark is gradually reduced if the distance between the tail end of the preset sliding track and the target content is gradually shortened; or the proportion of a preset color in the deletion progress mark is gradually increased if the distance between the tail end of the preset sliding track and the target content is gradually increased.

There is no limitation on how the preset color specifically and gradually changes, which may be the gradual change of the color type (that is, gradient color), and may also be the change of the proportion of the preset color directly filled in the mark (that is, the preset color gradually becomes transparent).

For example, the step that the proportion of the preset color in the deletion progress mark is gradually reduced if the distance between the tail end of the preset sliding track and the target content is gradually shortened includes:

as the distance between the screen contact point and the target content is shortened, the preset color in the deletion progress mark is gradually changed into other colors (which may be optionally colors different from the interface background color) and may finally become transparent, and there is no filling color in the deletion progress mark; or as the distance between the screen contact point and the target content is shortened, the preset color in the deletion progress mark directly becomes transparent according to the proportion (for example, the preset color in the deletion progress mark gradually becomes transparent according to the proportion from an interior of the deletion progress mark to an outer edge, thereby forming an annular mark with a gradually increased inner diameter until the inner diameter reaches an upper limit value).

For another example, the step that the proportion of the preset color in the deletion progress mark is gradually increased if the distance between the tail end of the preset sliding track and the target content includes:

as the distance between the screen contact point and the target content is increased, the deletion progress mark is gradually filled with a preset color (the deletion progress mark may be changed from transparency to other colors and then be gradually changed into the preset color, where the preset color may be optionally a color different from the interface background color); or as the distance between the screen contact point and the target content is increased, the interior of the deletion progress mark is directly changed from transparency to a preset color according to the proportion (for example, the interior of the deletion progress mark is gradually changed from transparency to the preset color according to the proportion from the interior of the deletion progress mark to the outer edge to form an annular mark with a gradually reduced inner diameter until the inner diameter reaches a lower limit value).

In the embodiments of the present disclosure, when the deletion progress of the content is 0%, the deletion progress mark may be a solid circle; when the deletion progress of the content is 100%, the deletion progress mark may be hollow circle; in the process that the deletion progress of the content is from 0% to 100%, the deletion progress mark may be a ring with a gradually increased inner diameter; in the process that the deletion progress of the content is from 100% to 0%, the deletion progress mark may be a ring with a gradually reduced inner diameter; however, it is not limited to this.

The content deleting method provided by the embodiments of the present disclosure is further described below, where the content takes a mobile phone app application as an example, the deletion progress mark takes a ring as an example, the operation of implementing the content deleting method takes the operation with two fingers as an example, and the preset sliding track takes a sliding track generated in the operation process of the two fingers as an example.

For the above technical problems, the embodiments of the present disclosure provide a content deleting method, specifically for deleting the mobile phone app application that a user does not want to use rapidly and simply, thereby giving the user a comfortable experience. By the solution, it is unnecessary to click the small round cross corner mark at the upper left corner of the application and the prompt of the pop-up box to confirm whether to delete when the application is deleted (the solution in the related art in FIG. 1), and the ring in the deletion state is operated and displayed friendly by two fingers, thereby improving the interactive experience of the user and the mobile phone.

It may also be understood that the embodiments of the present disclosure specifically may provide a method for deleting mobile phone application based on two-finger operation, which removes the operation of clicking the small round cross at the upper left corner of the application, skips the pop-up box function of the unfriendly visual interactive experience and deletes the application through the operation of moving the far finger to the finger which presses the application, thereby ensuring that the application is safely deleted.

Figure 3:
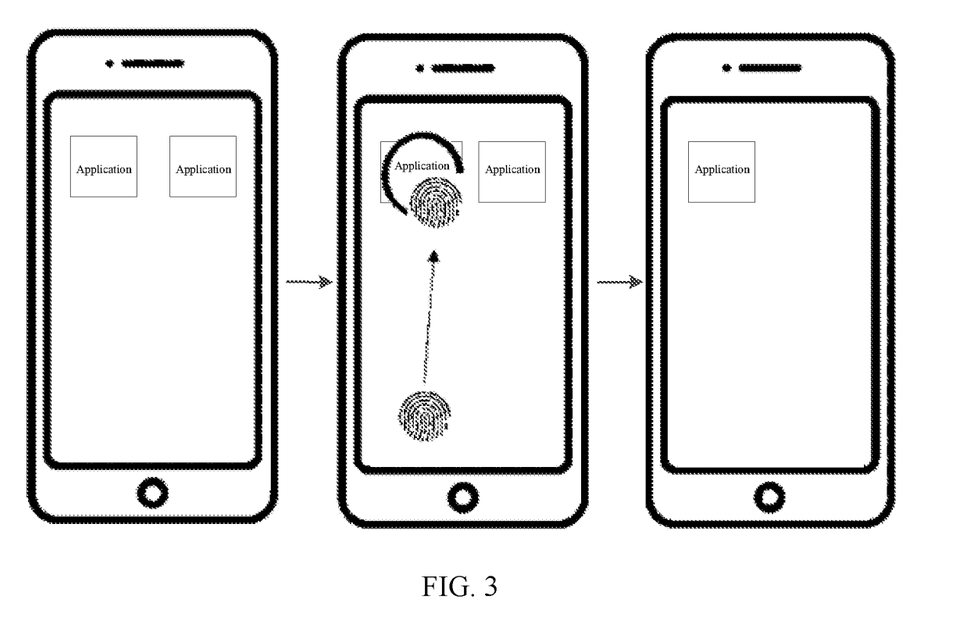
FIG. 3 is a schematic diagram of app deletion operation according to an embodiment of the present disclosure.

The process of deleting the application through two-finger operation is as shown in FIG. 3:

(1) Firstly, an application deleting function is started.

The state where the mobile phone app application may be deleted is entered.

(2) Then, the clicking finger presses the app application, and another finger moves closer to this finger from the far end. When another finger is close to this finger, a solid circle will gradually become a hollow ring at the periphery of an application icon.

The precondition is: firstly, two fingers are required to operate on the screen, one finger presses the app application to be deleted for locking operation, the other finger presses the screen from a distance, the finger does not leave the screen, and then the far finger approaches this finger which is used for locking.

When the far finger touches the screen, an outer ring of the locked app application icon may be provided with a solid ring larger than the icon, and the far finger gradually approaches the locked app application iron to form a preset sliding track. At this time, the solid ring gradually becomes a hollow ring until the ring at the outer ring disappears, and then the app application is deleted. When the ring at the outer ring of the app icon is still hollow, it only indicates that the ring is being deleted. When the finger from the far end retreats to the far end or the two fingers touching the screen leave the screen, it indicates that the user does not want to delete the application and cancels the deletion of the app application.

(3) Finally, the app application is deleted.

The solution is mainly as follows: (1) the unfriendly small round cross in the second step in FIG. 1, the operation of clicking the small round cross on the upper left of the application in the third step in FIG. 1, and the operation of clicking the unfriendly pop-up box prompt and user selection in the fourth step in FIG. 1 are removed. Through two-finger operation, the continuity of the deletion action and the visual experience of the user mark a to-be-deleted state by a solid ring, and the ring gradually becomes hollow until the ring disappears, which means the app application is deleted, so that the interactive experience is improved without reducing the safety.

(2) Moreover, the small round cross which will appear on the upper left of each icon is removed, so that the visual experience displayed by the original app may be maintained. For users with intensive phobia, the psychological pressure caused by the appearance of a plurality of repeated intensive icons is avoided, and the visual experience of the user is improved.

(3) Furthermore, the mode of clicking the small round cross at the upper left corner of the app application is changed into two-finger operation. Since the finger touches one application icon and the touch area is many times larger than the small round cross, the operation accuracy and convenience are better than the mode of clicking the small round cross.

(4) In the second step in FIG. 3, the solid ring at the outer ring of the application app represents the real-time presentation of the state of deleting the app application, and shows the state where the app application is deleted synchronously in real time on the basis of maintaining the continuity of deletion operation, thereby giving the user an experience like floating clouds and flowing water. Meanwhile, there will be a situation where the user hesitates to delete in this process. At this time, the finger from the far end may be retreated timely, and the change state of the solid proportion of the ring may be seen. When the user decides not to delete, the finger can leave the screen and the user can give up the deletion. This is more visual, friendly, coherent and safe than the operation of popping up the box directly to let the user choose whether to delete or not.

Figure 4:
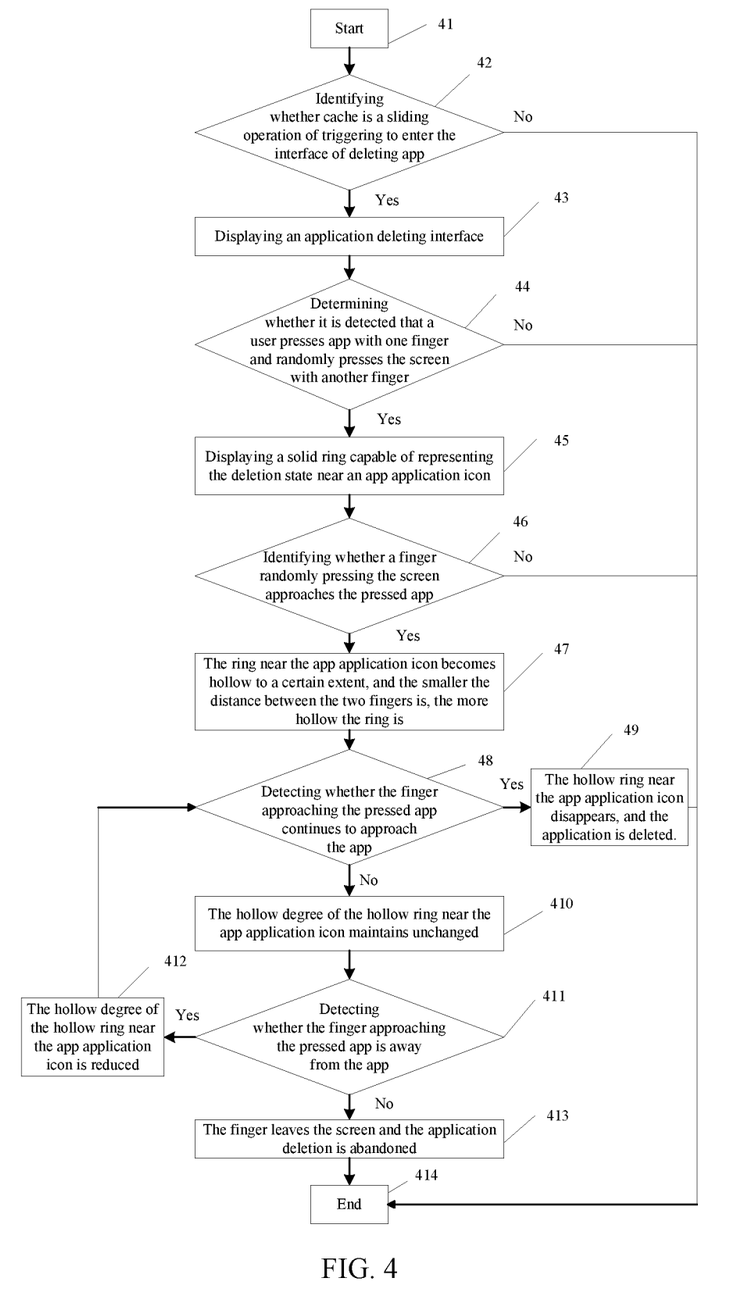
FIG. 4 is a schematic diagram of a specific application process of a content deleting method according to an embodiment of the present disclosure.

Specifically, the solution provided by the embodiment of the present disclosure may, as shown in FIG. 4, include:

Step 41: start.

Step 42: whether there is a sliding operation of triggering to enter the interface of deleting app is identified, if yes, Step 43 is entered, and if not, Step 414 is entered.

Step 43: an application deleting interface is displayed, where at this time, the application may float on the desktop of the mobile phone and the application enters a state where the application may be moved and deleted.

Step 44: whether it is detected that a user presses app with one finger and randomly presses the screen with another finger is determined, if yes, Step 45 is entered, and if not, Step 414 is entered.

That is, when two fingers touch the screen, the system will detect whether the two fingers performs a series of operation and judge whether the application enters a to-be-deleted state.

If the first finger presses the application first and then another finger presses the screen, the application enters the to-be-deleted state.

If the first finger does not press the application first and then another finger does not press the application screen, it is detected that the application does not enter the to-be-deleted state.

Step 45: a solid ring (solid ring: representing to be deleted, hollow ring: representing being deleted, hollow proportion: representing the deletion degree, and ring disappearing: representing deletion is completed) capable of representing a deletion state is displayed near an app application icon, that is, the app application enters the to-be-deleted state, and at this time, a solid ring representing to be deleted appears around the app application icon. Solid ring: represents that the application enters a to-be-deleted state. Hollow ring: represents that the application is being deleted, and the hollow proportion represents the deletion degree. Ring disappearing: represents that the application is deleted.

Step 46: whether a finger which randomly presses the screen approaches the pressed app is identified (it may also be understood that whether a screen contact point moves towards the target content), if yes, Step 47 is entered, and if not, Step 414 is entered, that is, the finger which randomly presses the screen approaches the finger which presses the application app to form the above preset sliding track, and at this time, the app application will change from the to-be-deleted state into the state of being deleted.

The above preset sliding track is not necessarily a static track, and may also be a plurality of continuous tracks in the process of forming a pattern, which may be understood as a gradually changing dynamic track.

Step 47: the ring near the app application icon becomes hollow to a certain extent, and the smaller the distance between the two fingers is, the more hollow the ring is.

That is, the ring near the app application icon becomes hollow. The closer the two fingers are to each other, the higher the hollow proportion of the ring is, and the closer to the completion of the deletion operation. The hollow degree of the ring is represented in real time with the distance between the two fingers, thereby giving the user the playable visual experience.

Step 48: whether the finger approaching the pressed app continues to approach the app is detected, if yes, Step 49 is entered, and if not, Step 410 is entered.

That is, whether the finger randomly pressing the screen continues to approach the pressed app (continues to form the above preset sliding rack), at this time, the user may wander between deleting and abandoning the deletion. The two fingers continue to approach, which represents that the application continues to be deleted. The two fingers do not approach, which represents that a static state of abandoning operation or deletion may be entered.

Step 49: the hollow ring near the app application icon disappears, the application is deleted, and Step 414 is entered.

That is, the hollow ring near the app application icon disappears, the application is deleted, and the operation of deleting the app application at this time ends.

Step 410: the hollow degree of the hollow ring near the app application icon maintains unchanged.

Step 411: whether the finger approaching the pressed app is far away from the app (performing the reverse operation of forming the above preset sliding track) is detected, if yes, Step 412 is entered, and if not, Step 413 is entered.

Step 412: the hollow degree of the hollow ring near the app application icon is reduced, and the process returns to Step 48.

Step 413: the finger leaves the screen and the application deletion is abandoned.

Step 414: ending.

It can be seen from the above that the solution provided by the embodiment of the present disclosure may make users experience comfortable feeling, operation convenience, visual sense and playability.

(1) The intensive small round crosses in the second step of FIG. 1 are removed, thereby giving the user a comfortable feeling of keeping the original desktop clean and tidy.

(2) The operation of clicking the small round cross on the upper left of the application icon in the third step of FIG. 1 is removed (the action area of the small round cross is small), and is changed into the action range of the whole app icon, and thus the operation is more convenient and rapid.

(3) The operation of clicking the unfriendly pop-up box prompt and selection in the fourth step of FIG. 1 is removed, and is changed into two-finger operation of deleting the app, thereby ensuring the application deleting safety, and increasing a state where a ring displays the deletion operation in real time on the basis of the visual sense of the user; moreover, the user may wander whether to delete in the operation, thereby improving the playability.

It is noted here that the solution provided by the embodiment of the present disclosure may also be applied to a series of operations of rapidly deleting files, videos and the like; the solution provided by the embodiment of the present disclosure is to safely delete the application by changing the original deletion mode and through the operation that two fingers approach rapidly, so that the small round cross on the upper left of the application and the pop-up box prompt appearing after the small round cross is clicked are removed; and the solution is suitable for operation of deleting files and videos of the mobile phone, and the specific operation mode is similar to the example shown in FIG. 4.

Figure 5:
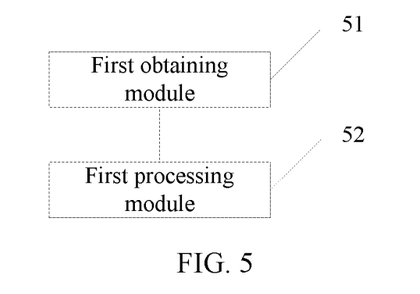
FIG. 5 is a first structural schematic diagram of a terminal according to an embodiment of the present disclosure.

The embodiment of the present disclosure further provides a terminal, as shown in FIG. 5, including:

a first acquisition module 51, configured to acquire a selected target content in the terminal interface when a content on the terminal interface is in a deletable state; and a first processing module 52, configured to perform deletion operation on the target content if a preset sliding track aiming at the target content is detected.

According to the terminal provided by the embodiments of the present disclosure, the selected target content in the terminal interface is acquired when the content on the terminal interface is in a deletable state; if the preset sliding track aiming at the target content is detected, deletion operation is performed on the target content; and it is unnecessary to click the small round cross corner mark at the upper left corner of the application and the prompt of the pop-up box to confirm whether to delete when the application is deleted, the interactive experience of the user and the terminal is improved through simple and convenient operation, the safety of deleting the application is ensured, and the problems in the related art that the app application deleting solution is complicated in process and inconvenient in operation are solved well.

The first processing module includes: a first setting submodule, configured to set the state of the content on the terminal interface as a deletable state when detecting that a first pressing operation on the terminal interface reaches a first preset duration; a first processing submodule, configured to detect a pressing position of a second pressing operation and acquire a target content corresponding to the pressing position; and a first determination module, configured to determine that the target content corresponding to the pressing position is the selected target content in the terminal interface when the duration of the second pressing operation reaches a second preset duration. The first pressing operation and the second pressing operation are the same pressing operation or different pressing operations.

Furthermore, the terminal further includes: a first display module, configured to display a deletion progress mark if a preset sliding track aiming at the target content is detected after the selected target content in the terminal interface is acquired.

Correspondingly, the first processing module includes: a second processing submodule, configured to delete the target content and display the deletion progress of the target content.

Specifically, the second processing submodule includes: a first updating unit, configured to update the color of the deletion progress mark according to a real-time distance between a tail end of the preset sliding track and the target content, where the color of the deletion progress mark is configured to represent the deletion progress of the target content.

More specifically, the first updating unit includes: a first processing subunit, configured to: gradually reduce the proportion of the preset color in the deletion progress mark if the distance between the tail end of the preset sliding rack and the target content is gradually shortened, or gradually increase the proportion of the preset color in the deletion progress mark if the distance between the tail end of the preset sliding track and the target content is gradually increased.

The terminal provided by the embodiment of the present disclosure can implement processes implemented by the terminal in the method embodiments of FIG. 1 to FIG. 4. To avoid repetition, details are not described herein again.

Figure 6:
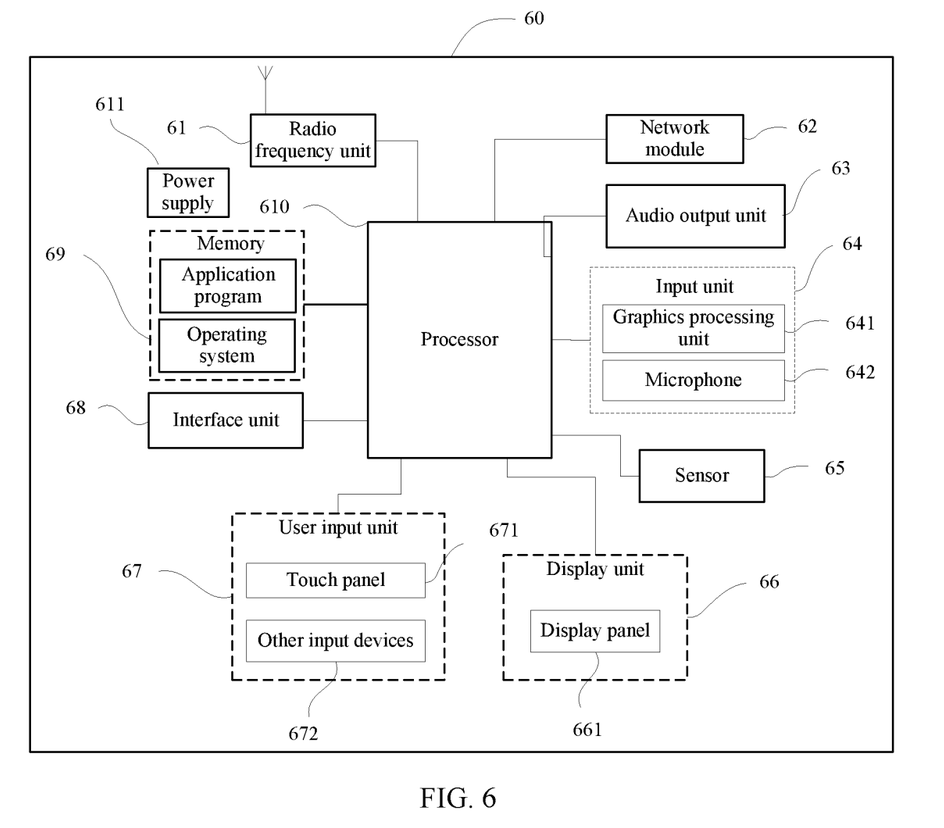
FIG. 6 is a second structural schematic diagram of a terminal according to an embodiment of the present disclosure.

FIG. 6 is a schematic structural diagram of hardware of a terminal implementing embodiments of the present disclosure. The terminal 60 includes but is not limited to: a radio frequency unit 61, a network module 62, an audio output unit 63, an input unit 64, a sensor 65, a display unit 66, a user input unit 67, an interface unit 68, a memory 69, a processor 610, a power supply 611, and other components. A person skilled in the art may understand that the structure of the terminal shown in FIG. 6 does not constitute a limitation to the terminal. The terminal may include more or fewer components than those shown in the figure, or some components may be combined, or there may be a different component arrangement. In this embodiment of the present disclosure, the terminal includes but is not limited to a mobile phone, a tablet computer, a laptop computer, a palmtop computer, a vehicle-mounted terminal, a wearable device, a pedometer, and the like.

The processor 610 is configured to: acquire the selected target content in the terminal interface when the content on the terminal interface is in a deletable state, and perform deletion operation on the target content if a preset sliding rack aiming at the target content is detected.

In the embodiments of the present disclosure, the selected target content in the terminal interface is acquired when the content on the terminal interface is in a deletable state; if the preset sliding track aiming at the target content is detected, deletion operation is performed on the target content; and it is unnecessary to click the small round cross corner mark at the upper left corner of the application and the prompt of the pop-up box to confirm whether to delete when the application is deleted, the interactive experience of the user and the terminal is improved through simple and convenient operation, the safety of deleting the application is ensured, and the problems in the related art that the app application deleting solution is complicated in process and inconvenient in operation are solved well.

Optionally, the processor 610 is specifically configured to: set the state of the content on the terminal interface as a deletable state when it is detected that a first pressing operation on the terminal interface reaches a first preset duration, detect a pressing position of a second pressing operation and acquire a target content corresponding to the pressing position, and determine that the target content corresponding to the pressing position is the selected target content in the terminal interface when the duration of the second pressing operation reaches a second preset duration, where the first pressing operation and the second pressing operation are the same pressing operation or different pressing operations.

Optionally, the processor 610 is further configured to display a deletion progress mark if a preset sliding track aiming at the target content is detected after the selected target content in the terminal interface is acquired.

The processor 610 is specifically configured to delete the target content and display the deletion progress of the target content.

Optionally, the processor 610 is specifically configured to update the color of the deletion progress mark according to a real-time distance between a tail end of the preset sliding track and the target content, where the color of the deletion progress mark is configured to represent the deletion progress of the target content.

Optionally, the processor 610 is specifically configured to gradually reduce the proportion of the preset color in the deletion progress mark if the distance between the tail end of the preset sliding rack and the target content is gradually shortened, or gradually increase the proportion of the preset color in the deletion progress mark if the distance between the tail end of the preset sliding track and the target content is gradually increased.

It should be understood that, in this embodiment of the present disclosure, the radio frequency unit 61 may be configured to receive and send information or a signal in a call process. Specifically, after receiving downlink data from a base station, the radio frequency unit 61 sends the downlink data to the processor 610 for processing. In addition, the radio frequency unit 61 sends uplink data to the base station. Usually, the radio frequency unit 61 includes but is not limited to: an antenna, at least one amplifier, a transceiver, a coupler, a low noise amplifier, a duplexer, and the like. In addition, the radio frequency unit 61 may also communicate with a network and other devices through a radio communication system.

The terminal provides a user with wireless broadband Internet access through the network module 62, for example, help the user send and receive emails, browse web pages, and access streaming media.

The audio output unit 63 may convert audio data received by the radio frequency unit 61 or the network module 62 or stored in the memory 69 into an audio signal and output the audio signal as a sound. Moreover, the audio output unit 63 may further provide audio output related to a specific function performed by the terminal 60 (such as a call signal reception sound, a message reception sound, or the like). The audio output unit 63 includes a loudspeaker, a buzzer, a telephone receiver, and the like.

The input unit 64 is configured to receive an audio signal or a video signal. The input unit 64 may include a Graphics Processing Unit (GPU) 641 and a microphone 642. The graphics processing unit 641 processes image data of a static image or a video acquired by an image capture device (for example, a camera) in a video capture mode or an image capture mode. A processed image frame may be displayed on the display unit 66. The image frame processed by the graphics processing unit 641 may be stored in the memory 69 (or other storage mediums) or sent by using the radio frequency unit 61 or the network module 62. The microphone 642 may receive a sound and can process such sound into audio data. The audio data obtained through processing may be converted, in a telephone call mode, into a format that may be sent to a mobile communication base station via the radio frequency unit 61 for output.

The terminal 60 further includes at least one sensor 65, for example, a light sensor, a motion sensor, and other sensors. Specifically, the light sensor includes an ambient light sensor and a proximity sensor, where the ambient light sensor can adjust brightness of the display panel 661 according to brightness of ambient light, and the proximity sensor can turn off the display panel 661 and/or backlight when the terminal 60 is moved towards the ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 65 may further include a fingerprint sensor, a pressure sensor, an iris sensor, a molecular sensor, a gyroscope, a barometer, a hygrometer, a thermometer, an infrared sensor, and the like. This is not described herein.

The display unit 66 is configured to display information entered by a user or information provided for a user. The display unit 66 may include a display panel 661, and the display panel 661 may be configured in a form of Liquid Crystal Display (LCD), Organic Light-Emitting Diode (OLED), or the like.

The user input unit 67 may be configured to receive the input digital or character information, and generate key signal input related to user setting and function control of the terminal. Specifically, the user input unit 67 includes a touch panel 671 and other input devices 672. The touch panel 671, also called a touch screen, may collect touch operation on or near the touch panel by users (for example, operation on the touch panel 671 or near the touch panel 671 by fingers or any suitable objects or accessories such as a touch pen by the users). The touch panel 671 may include two parts: a touch detection device and a touch controller. The touch detection device detects a touch position of a user, detects a signal brought by a touch operation, and transmits the signal to the touch controller. The touch controller receives touch information from the touch detection device, converts the touch information into contact coordinates, sends the contact coordinates to the processor 610, and receives and executes a command from the processor 610. In addition, the touch panel 671 may be implemented by various types such as a resistive type, a capacitive type, an infrared ray type or a surface acoustic wave type. In addition to the touch panel 671, the user input unit 67 may further include other input devices 672. Specifically, the other input devices 672 may include but are not limited to: a physical keyboard, a function key (such as a volume control key, a switch key), a trackball, a mouse, and a joystick, which is no longer repeated here.

Further, the touch panel 671 may cover the display panel 661. When detecting a touch operation on or near the touch panel 671, the touch panel 671 transmits the touch operation to the processor 610 to determine a type of a touch event. Then the processor 610 provides corresponding visual output on the display panel 661 based on the type of the touch event. Although in FIG. 6, the touch panel 671 and the display panel 661 are two independent components to implement input and output functions of the terminal, but the touch panel 671 and the display panel 661 may be integrated to implement the input and output functions of the terminal in some embodiments, which is not specifically limited here.

The interface unit 68 is an interface connecting an external apparatus to the terminal 60. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 68 may be configured to receive an input (such as data information, electric power) from the external apparatus and transmit the received input to one or more elements within the terminal 60, or the interface unit 68 may be configured to transmit data between the terminal 60 and the external device.

The memory 69 may be configured to store a software program as well as every kind of data. The memory 69 may primarily include a program storage area and a data storage area, where the program storage area may store an operating system, an application program (such as a sound playing function, an image playing function) required for at least one function, and the like; and the data storage area may store data (such as audio data, a phone book) created based on the use of a mobile phone. In addition, the memory 69 may include a high-speed random access memory, and may further include a non-volatile memory such as at least one magnetic disk storage component, a flash memory component, or another volatile solid-state storage component.

The processor 610 is a control center of the terminal, connects various parts of the entire terminal by using various interfaces and circuits, and performs various functions of the terminal and processes data by running or executing software programs and/or modules stored in the memory 69 and invoking data stored in the memory 69, so as to monitor the terminal as a whole. The processor 610 may include one or more processing units. Optionally, the processor 610 may integrate an application processor and a modem processor. The application processor mainly deals with an operating system, a user interface, an application program, and the like. The modem processor mainly deals with wireless communication. It may be understood that the foregoing modem processor may not be integrated into the processor 610.

The terminal 60 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 60 includes some function modules that are not shown, which are no longer repeated here.

Optionally, the embodiments of the present disclosure further provide a terminal, including a processor 610, a memory 69, and a computer program which is stored in the memory 69 and capable of running on the processor 610. The computer program, when being executed by the processor 610, implements the processes of the above content deleting method embodiment, and the same technical effect can be achieved. To avoid repetition, details are not described herein again.

The embodiments of the present disclosure further provide a computer readable storage medium. The computer readable storage medium stores a computer program. The computer program, when being executed by the processor, implements the processes of the above content deleting method embodiment, and the same technical effect can be achieved. To avoid repetition, details are not described herein again. The computer-readable storage medium is, for example, a Read-Only Memory (ROM), a Random Access Memory (RAM), a magnetic disk, or an optical disk.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. In the absence of more limitations, an element defined by "including a . . . " does not preclude the existence of other identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is an exemplary implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A content deleting method, performed by a terminal, comprising:
   acquiring a target content selected by a user using a first finger pressing on a content displayed in a terminal interface; and
   performing a deletion operation on the target content selected by the user upon detecting a preset sliding track aiming at the target content selected by the user, wherein the preset sliding track is formed by a second finger of the user touching a blank space on a screen of the terminal interface and sliding towards the first finger that is pressing on the content as the acquired target content selected by the user.

2. The content deleting method according to claim 1, wherein the acquiring the target content selected by the user using the first finger pressing on the content displayed in the terminal interface comprises a first pressing operation and a second pressing operation,
   wherein the first pressing operation is for setting a state of the pressed content in the terminal interface as a deletable state upon a duration of the first pressing operation in the terminal interface reaching a first preset duration,
   wherein the second pressing operation is for acquiring a pressing position of the content pressed by the first finger and determining the content pressed by the first finger corresponding to the pressing position as the target content selected by the user in the terminal interface upon a duration of the second pressing operation reaching a second preset duration.

3. The content deleting method according to claim 1, wherein, after the acquiring the target content selected by the user using the first finger pressing on the content displayed in the terminal interface, the method further comprises:
   displaying a deletion progress mark upon detecting the preset sliding track aiming at the target content selected by the user,
   wherein the performing the deletion operation on the target content selected by the user comprises:
   deleting the target content selected by the user and displaying a deletion progress of the target content selected by the user using the deletion progress mark.

4. The content deleting method according to claim 3, wherein the displaying the deletion progress of the target content selected by the user using the deletion progress mark comprises:
   updating a color of the deletion progress mark according to a real-time distance between a screen contact point of the second finger of the user of the preset sliding track and the target content selected by the user,
   wherein the color of the deletion progress mark represents the deletion progress of the target content selected by the user.

5. The content deleting method according to claim 4, wherein the updating the color of the deletion progress mark according to the real-time distance between the screen contact point of the second finger of the user of the preset sliding track and the target content selected by the user comprises:

gradually reducing a proportion of a preset color in the deletion progress mark when the distance between the screen contact point of the second finger of the user of the preset sliding track and the target content selected by the user is gradually shortened; or gradually increasing the proportion of the preset color in the deletion progress mark when the distance between the screen contact point of the second finger of the user of the preset sliding track and the target content selected by the user is gradually increased.

6. A terminal, comprising a processor, a memory, and a computer program stored in the memory and executable on the processor, wherein the computer program, when executed by the processor, causes the processor to:

acquire a target content selected by a user using a first finger pressing on a content displayed in a terminal interface and perform a deletion operation on the target content selected by the user upon detecting a preset sliding track aiming at the target content selected by the user, wherein the preset sliding track is formed by a second finger of the user touching a blank space on a screen of the terminal interface and sliding towards the first finger that is pressing on the content as the acquired target content selected by the user.

7. The terminal according to claim 6, wherein to acquire the target content selected by the user using the first finger pressing on the content displayed in the terminal interface comprises a first pressing operation and a second pressing operation, wherein the first pressing operation is for setting a state of the pressed content in the terminal interface as a deletable state upon a duration of the first pressing operation in the terminal interface reaching a first preset duration, wherein the second pressing operation is for acquiring a pressing position of the content pressed by the first finger and determining the content pressed by the first finger corresponding to the pressing position as the target content selected by the user in the terminal interface upon a duration of the second pressing operation reaching a second preset duration.

8. The terminal according to claim 6, wherein the processor is further configured to:

display a deletion progress mark upon detecting the preset sliding track aiming at the target content selected by the user, wherein to perform the deletion operation on the target content selected by the user, the processor is further configured to:

delete the target content selected by the user and display a deletion progress of the target content selected by the user using the deletion progress mark.

9. The terminal according to claim 8, wherein to display the deletion progress of the target content selected by the user using the deletion progress mark, the processor is further configured to:

update a color of the deletion progress mark according to a real-time distance between a screen contact point of the second finger of the user of the preset sliding track and the target content selected by the user, wherein the color of the deletion progress mark represents the deletion progress of the target content selected by the user.

10. The terminal according to claim 9, wherein to update the color of the deletion progress mark according to the real-time distance between the screen contact point of the second finger of the user of the preset sliding track and the target content selected by the user, the processor is further configured to:

gradually reduce a proportion of a preset color in the deletion progress mark when the distance between the screen contact point of the second finger of the user of the preset sliding track and the target content selected by the user is gradually shortened; or gradually increase the proportion of the preset color in the deletion progress mark when the distance between the screen contact point of the second finger of the user of the preset sliding track and the target content selected by the user is gradually increased.

11. A non-transitory computer readable storage medium, storing a computer program, when being executed by the processor, the computer program implements a content deleting method, the content deleting method comprising:

acquiring a target content selected by a user using a first finger pressing on a content displayed in a terminal interface and performing a deletion operation on the target content selected by the user upon detecting a preset sliding track aiming at the target content selected by the user, wherein the preset sliding track is formed by a second finger of the user touching a blank space on a screen of the terminal interface and sliding towards the first finger that is pressing on the content as the acquired target content selected by the user.

12. The non-transitory computer readable storage medium according to claim 11, wherein the acquiring the target content selected by the user using the first finger pressing on the content displayed in the terminal interface comprises a first pressing operation and a second pressing operation, wherein the first pressing operation is for setting a state of the pressed content in the terminal interface as a deletable state upon a duration of the first pressing operation in the terminal interface reaching a first preset duration, wherein the second pressing operation is for acquiring a pressing position of the content pressed by the first finger and determining the content pressed by the first finger corresponding to the pressing position as the target content selected by the user in the terminal interface upon a duration of the second pressing operation reaching a second preset duration.

13. The non-transitory computer readable storage medium according to claim 11, wherein, after the acquiring the target content selected by the user using the first finger pressing on the content displayed in the terminal interface, the method further comprises:

displaying a deletion progress mark upon detecting the preset sliding track aiming at the target content selected by the user, wherein the performing the deletion operation on the target content selected by the user comprises:

deleting the target content selected by the user and displaying a deletion progress of the target content selected by the user using the deletion progress mark.

14. The non-transitory computer readable storage medium according to claim 13, wherein the displaying the deletion progress of the target content selected by the user using the deletion progress mark comprises:

updating a color of the deletion progress mark according to a real-time distance between a screen contact point of the second finger of the user of the preset sliding track and the target content selected by the user, wherein the color of the deletion progress mark represents the deletion progress of the target content selected by the user.

15. The non-transitory computer readable storage medium according to claim 14, wherein the updating the color of the deletion progress mark according to the real-time distance between the screen contact point of the second finger of the user of the preset sliding track and the target content selected by the user comprises:

gradually reducing a proportion of a preset color in the deletion progress mark when the distance between the screen contact point of the second finger of the user of the preset sliding track and the target content selected by the user is gradually shortened; or gradually increasing the proportion of the preset color in the deletion progress mark when the distance between the screen contact point of the second finger of the user of the preset sliding track and the target content selected by the user is gradually increased.

* * * * *